US009996108B2

(12) United States Patent
Morrison et al.

(10) Patent No.: US 9,996,108 B2
(45) Date of Patent: Jun. 12, 2018

(54) BI-STABLE HINGE

(71) Applicant: Dell Products, LP, Round Rock, TX (US)

(72) Inventors: John Trevor Morrison, Round Rock, TX (US); Marco Marroquin, Austin, TX (US); Jung-Hwan Hong, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days. days.

(21) Appl. No.: 14/496,443

(22) Filed: Sep. 25, 2014

(65) Prior Publication Data

US 2016/0091923 A1 Mar. 31, 2016

(51) Int. Cl.
*G06F 1/16* (2006.01)

(52) U.S. Cl.
CPC .......... *G06F 1/1616* (2013.01); *G06F 1/1652* (2013.01); *G06F 1/1681* (2013.01)

(58) Field of Classification Search
CPC .................. G06F 1/1616; G06F 1/1652; G06F 2200/1612
See application file for complete search history.

(56) References Cited

U.S. PATENT DOCUMENTS

| | | |
|---|---|---|
| 6,094,341 A | 7/2000 | Lin |
| 7,136,282 B1 | 11/2006 | Rebeske |
| 7,354,033 B1 * | 4/2008 | Murphey ............... B64G 1/222 267/151 |
| 7,821,780 B2 | 10/2010 | Choy |
| 9,255,619 B2 * | 2/2016 | Zavattieri ................. F16F 3/02 |
| 2003/0142469 A1 | 7/2003 | Ponx |
| 2005/0237269 A1 | 10/2005 | Connor et al. |
| 2006/0026535 A1 | 2/2006 | Hotelling et al. |
| 2006/0109259 A1 | 5/2006 | Ohta |
| 2007/0133156 A1 * | 6/2007 | Ligtenberg ............ G06F 1/1616 361/679.27 |
| 2009/0103261 A1 * | 4/2009 | Shih ........................ E05C 19/16 361/679.58 |

(Continued)

FOREIGN PATENT DOCUMENTS

WO  WO 2012/044516 A2  4/2012
WO  WO 2013/107318 A1  7/2013

OTHER PUBLICATIONS

N. Ravi, J. Scott, H. Lu, L. Iftode, "Context-aware Battery Management for Mobile Phones," In Pervasive Computing and Communications, p. 224-233, 2008, p. 1-10.

(Continued)

*Primary Examiner* — Afroza Chowdhury
(74) *Attorney, Agent, or Firm* — Prol Intellectual Property Law, PLLC; H. Kenneth Prol (57) ABSTRACT

An information handling system includes a flexible display screen, first and second display platforms, and a bi-stable hinge. The flexible display screen is movably mounted to the first and second display platforms. The bi-stable hinge is mounted to the first and second display platforms and couples the first display platform to the second display platform. The bi-stable hinge locks the first and second display platforms in an open position and snap closes the first and second display platforms from the open position to a closed position in response to the bi-stable hinge being stressed in a first direction.

20 Claims, 3 Drawing Sheets

(56) References Cited

U.S. PATENT DOCUMENTS

| | | | |
|---|---|---|---|
| 2009/0231233 A1* | 9/2009 | Liberatore | G06F 1/1616 345/1.3 |
| 2009/0296331 A1 | 12/2009 | Choy | |
| 2010/0031203 A1 | 2/2010 | Morris et al. | |
| 2011/0032199 A1 | 2/2011 | Seo et al. | |
| 2012/0314399 A1* | 12/2012 | Bohn | G06F 1/1616 362/97.1 |
| 2013/0021762 A1* | 1/2013 | van Dijk | G06F 1/1652 361/749 |
| 2013/0058063 A1 | 3/2013 | O'Brien | |
| 2013/0082427 A1* | 4/2013 | Zavattieri | F16F 3/02 267/159 |
| 2013/0127905 A1 | 5/2013 | Zhang et al. | |
| 2013/0201101 A1 | 8/2013 | Niu et al. | |
| 2013/0342094 A1 | 12/2013 | Walters | |
| 2014/0009445 A1 | 1/2014 | Kim et al. | |
| 2014/0247198 A1 | 9/2014 | Yang et al. | |

OTHER PUBLICATIONS

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

"This End Up: Using Device Orientation," by Pete LePage, Apr. 29, 2011, http://www.html5rocks.com/en/tutorials/device/orientation/, p. 1-17.

Sony Tablet p—Dual screen for maximum mobility, Get more done on the go with two 13.9 cm (5.5") touch screens, 1GB RAM, MicroSD card storage, ultra light and compact design, Wi-Fi and 3G, http://www.sony.co.uk/product/sony-tablet-p/tab/overview, p. 1-12.

"NEC Unveils Bizarre Dual-Screen Medias W N-05E," CNET Editor's Take, Aug. 28, 2013, http://www.cnet.com/products/nec-medias-w-n-05e/, p. 1-8.

"Position Sensors; Android Developers," Sep. 6, 2013; http://developer.android.com/guide/topics/sensors/sensors_position.html, p. 1-5.

"Passive and Active Cooling Modes," Oct. 12, 2013, http://msdn.microsoft.com/en-us/library/windows/hardware/hh698271(v=vs.85).aspx, p. 1-2.

"A Procedure for Developing Intuitive and Ergonomic Gesture Interfaces for Man-Machine Interaction," M. Nielsen et al., Aalborg University, Laboratory of Computer Vision and Media Technology, Denmark, Technical Report CVMT 03-01, ISSN 1601-3646, CVMT, Aalborg University, Mar. 2003, pp. 1-12.

"Hidden Apple Patent for Flexible Display Devices Discovered," Patently Apple, Jan. 11, 2014, http://www.patentlyapple.com/patently-apple/2014/01/hidden-apple-patent-for-flexible-display-devices-discovered.html, p. 1-12.

"Apple Patents iPad Smart Magnets, used to Attach Gizmos Like Controllers or Cameras," James A., Feb. 20, 2014, https://tablet-news.com/apple-patents-ipad-smart-magnets-used-to-attach-gizmos-like-controllers-or-cameras/, p. 1-3.

"Apples's Wrap-Around Display Tech Could Kill Off Those Pesky Bezels [Patent]," Luke Dormehl, Feb. 13, 2014, https://www.cultofmac.com/266383/apples-wrap-around-display-tech-kill-pesky-bezels-patent/, p. 1-8.

"Talk about Timing: Apple's iWatch Patent Arrives," Patently Apple, Feb. 21, 2013, http://www.patentlyapple.com/patently-apple/2013/02/talk-about-timing-apples-wristwatch-patent-arrives.html, p. 1-6.

"Power-Saving Color Transformation of Mobile Graphical User Interfaces on OLED-based Displays," M. Dong et al., Aug. 19, 2009, p. 1-4.

* cited by examiner

BI-STABLE HINGE

FIELD OF THE DISCLOSURE

The present disclosure generally relates to bi-stable hinge for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens to output images. The information handling system can also include hinges to allow the display platforms can transition to different positions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing interact data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

FIGS. 1-4 show an information handling system including two hinged display platforms, a flexible display screen, closing magnets, and bi-stable hinges. In an embodiment, the flexible display screen may be able to slide or otherwise move with respect to one or both of the display platforms via slip material between the flexible display screen and the each of the display platforms. When the information handling system is in an open position, the display platforms are held substantially inline with each other via the bi-stable hinges. In an embodiment, the bi-stable hinges are rigid and can be locked in a straight line and can provide support to the flexible display screen while the information handling system is in the open position. Each of the bi-stable hinges is located in a cavity of the display platforms, and each of the bi-stable hinges has a curved cross section. The rigidity of a bi-stable hinge is determined by the dimensions of the bi-stable hinge, such as the thickness, width, and amount of curvature of the bi-stable hinge.

In an embodiment, each of the bi-stable hinges include a bend zone located substantially in the middle of the hinges, and the bend zone of each bi-stable hinge can be aligned above a gap in between the display platforms while the information handling system is in the open position. The bend zone isolates a location for the bi-stable hinge to bend in response to different forces being applied to the bi-stable hinge. In an embodiment, the bend zone can be thinner than the remaining portions of the bi-stable hinge, such that a lesser force is needed to cause the bi-stable hinge to bend at the bend zone than the force needed to cause the remaining portions of the bi-stable hinge to bend.

While the information handling system is in the open position, a force greater than the force needed to overcome the curvature of the bend zone of the bi-stable hinges can be applied to the information handling system. When the strength of the curvature and thickness of the bend zone are overcome by the force applied to the information handling system, the bi-stable hinges can automatically cause the display platforms to snap close from the open position to a closed position. In an embodiment, as the display platforms transition from the open position to the closed position, the flexible display screen slides along the one or both of display platforms.

Thus, the bi-stable hinges can hold in multiple positions with a force needing to be applied to keep the bi-stable hinges in that position, and the bi-stable hinges can automatically transition from one position to another after a force is applied to the bi-stable hinges that overcomes a curvature of the bi-stable hinges.

Figure 1:
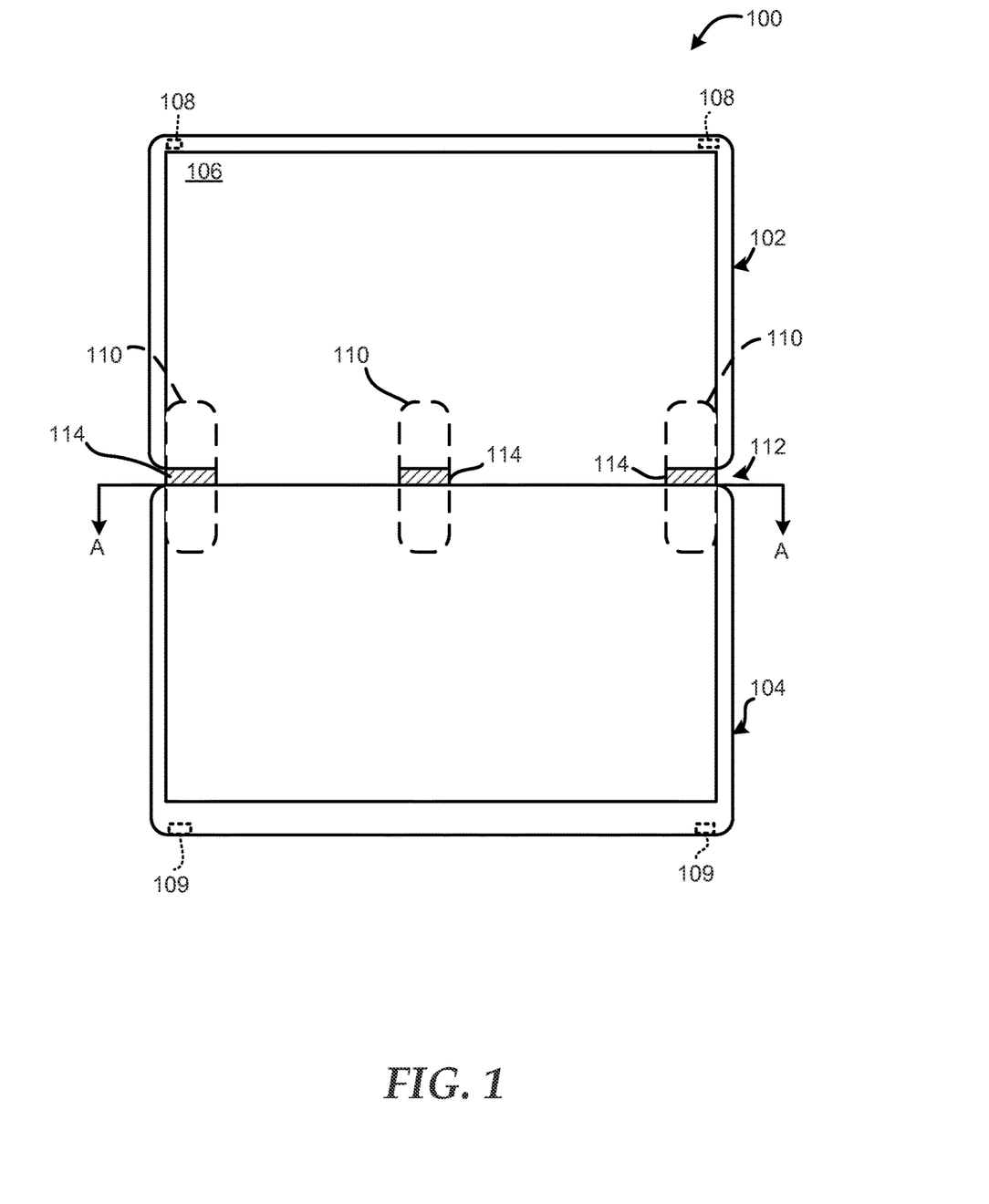
FIG. 1 is a diagram of a information handling system in an open position according to an embodiment of the present disclosure.

FIG. 1 shows an embodiment of a dual display platform information handling system 100 with two hinged display platforms according to an embodiment of the present disclosure. In this embodiment, the information handling system 100 includes display platforms 102 and 104, a flexible display screen 106, closing magnets 108 and 109, and bi-stable hinges 110. In an embodiment, display platforms 102 and 104 may include housings to contain underlying electronics and power components of the information handling system 100. Accordingly for the described embodiment, housings may be used interchangeably with display platforms. In an embodiment, the flexible display screen 106, such as a flexible active-matrix organic LED (AMOLED) display, may be mounted over or into display platforms 102 and 104. In the example embodiment, the display screen 106 may be mounted to and supported by the display platforms 102 and 104. The mounted flexible display screen 106 may be movably mounted to display platforms 102 and 104. In other words, mounted flexible display screen 106 may be able to slide or otherwise move with respect to one or both of the display platforms 102 and 104.

As illustrated in FIG. 1, the information handling system 100 is in a landscape page orientation, or open position, and the display platforms 102 and 104 are substantially inline with each other, and are connected together via the bi-stable hinges 110. In this illustrated embodiment, three bi-stable hinges 110 are mounted to both of the display platforms 102 and 104 and are utilized to connect the display platforms, one bi-stable hinge along each side of the flexible display screen 106 and one bi-stable hinge substantially in the middle of the two edges of the flexible display screen. In other embodiments, additional or fewer bi-stable hinges may used to connect the display platforms 102 and 104.

In an embodiment the bi-stable hinges 110 are made from a very durable material, such as silicon, spring steel, or the like. The durable material of the bi-stable hinges 110 can enable the display platforms 102 and 104 to be held with tension between the two display platforms without the bi-stable hinges breaking. Additionally, in this embodiment the bi-stable hinges 110 are rigid and can be locked in a straight line while the display platforms 102 and 104 are in the open position. As shown in the embodiment of FIG. 1, while the display platforms 102 and 104 are in the open position, a gap 112 is located between the two display platforms, and the gap can be defined by a length of the bi-stable hinges 110 extending between the display platforms. In an embodiment, the length of the bi-stable hinges 110 located between the display platforms 102 and 104 is based on the thickness of the display platforms, such that bi-stable hinges can have enough length to bend and allow the display platforms to be placed in a closed position as will be discussed in greater detail below.

While the information handling system 100 is in the open position, the bi-stable hinges 110 can align the display platforms 102 and 104 with each other and can provide support to the flexible display screen 106. The display platforms 102 and 104, the flexible display screen 106, and the bi-stable hinges 110 are interconnected to provide support to the display screen as shown in greater detail in FIG. 2.

Figure 2:
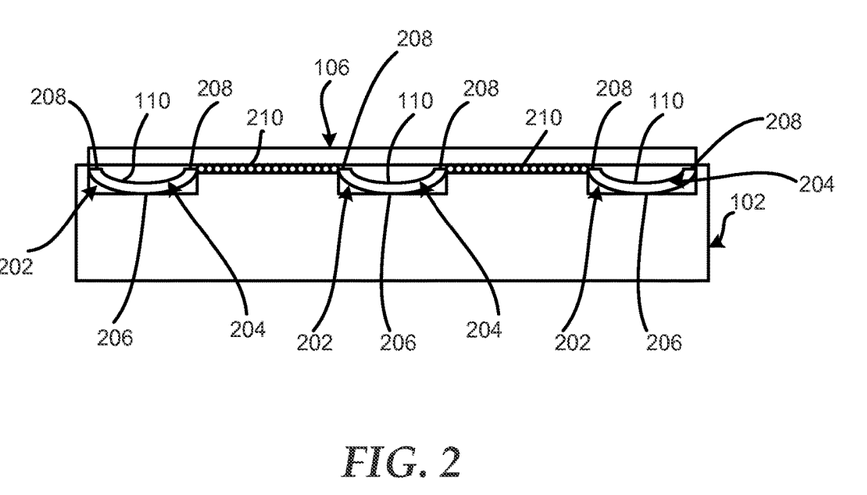
FIG. 2 is a diagram of a cross section of the information handling system according to an embodiment of the present disclosure.

FIG. 2 illustrates a cross section of the information handling system 100 taken along the line A-A of FIG. 1 according to an embodiment of the present disclosure. In an embodiment, the structure and physical communication among the flexible display screen 106, the bi-stable hinges 110, and the display platform 102 is substantially similar to the structure and physical communication among the flexible display screen, the bi-stable hinges, and the display platform 104. However, for clarity this structure and physical communication will be described only with respect to the flexible display screen 106, the bi-stable hinges 110, and display platform 102. As illustrated in FIG. 2, each of the bi-stable hinges 110 is located within a cavity 202 of the display platform 102, and each of the bi-stable hinges have a curved cross section 204 that extends the entire length of the bi-stable hinge. The curved cross section 204 is defined by a curvature having a bottom portion 206 and edges 208. In this embodiment, the bottom portion 206 is in physical communication with a bottom surface of the cavity 202, and the edges 208 of the bi-stable hinge 110 curve up and away from the bottom surface. In the illustrated embodiment, the curvature 204 of the bi-stable hinge 110 is concave to the flexible display screen 106, and the edges 208 are not placed in physical communication with the display screen. In another embodiment, the curvature 204 of the bi-stable hinge 110 is concave to the flexible display screen 106, and the edges 208 can be placed in physical communication with a bottom surface of the flexible display screen 106.

In an embodiment, the rigidity of a bi-stable hinge 110 is determined by the dimensions of the bi-stable hinge, such as the thickness, width, and amount of curvature of the bi-stable hinge. For example, a thicker bi-stable hinge 110 will be more rigid than a thinner bi-stable hinge, because a greater force is required to cause the thicker bi-stable hinge to bend than the thinner bi-stable hinge. Similarly, a greater force is required to bend a bi-stable hinge 110 with a narrower width than a bi-stable hinge with a wider width, such that the bi-stable hinge with a narrower width will be more rigid than the bi-stable hinge with a wider width. In an embodiment, the width of the bi-stable hinge 110 refers to a distance separating one edge 208 of the bi-stable hinge to the other edge. Another dimension of the bi-stable hinge 110 is the curvature of the cross section 204, such that a bi-stable hinge with a greater amount of curvature will require a higher force to bend the hinge than a bi-stable hinge with a lesser amount of curvature. Therefore, rigidity of the bi-stable hinge 110 increases with an increase in the curvature of the bi-stable hinge. In an embodiment, the curvature of the bi-stable hinge 110 is defined by a distance from a bottom surface of the bottom portion 206 to a top surface of the edges 208.

In an embodiment, the rigidity of the bi-stable hinge 110, or amount of three required to bend the hinge, can also vary based on the shape of the bi-stable hinge. For example, a bi-stable hinge 110 that is rectangular in shape without any edges extending away from the bi-stable hinge in a direction opposite the bottom surface of the cavity 202 will be less rigid than bi-stable hinges with the curved cross section 204 as shown in FIG. 2.

The information handling system 100 further includes slide material 210 that is located between the display platform 104 and the flexible display screen 106. In an embodiment, the slide material 210 can be metal pieces, ball bearings, or any other type of material that can reduce the friction between the display platforms 102 and 104 and the flexible display screen 106 while the flexible display screen slides along the display platforms.

Referring back to FIG. 1, each of the bi-stable hinges 110 include a bend zone 114 located substantially in the middle of the hinges. However, in other embodiments, the bend zone 114 can be located in different portions of the bi-stable hinges 110. In an embodiment, the bend zone 114 of each bi-stable hinge 110 can be aligned above the gap 112 in between the display platforms 102 and 104 while the information handling system 100 is in the open position. The bend zone 114 isolates a location for the bi-stable hinge 110 to bend in response to different forces being applied to the bi-stable hinge. In an embodiment, the bend zone 114 can be thinner than the remaining portions of the bi-stable hinge 110, such that a lesser force is needed to cause the bi-stable hinge to bend at the bend zone than the force needed to cause the remaining portions of the bi-stable hinge to bend. In this embodiment, the bi-stable hinge 110 will bend within the bend zone 114, such that the hinge can properly align the display platforms 102 and 104 while the information handling system 100 is transitioned the open position to another position in response to a force being applied to the display platforms.

For example, the information handling system 100 can be in the open position and a force, to transition the information handling system 100 to the closed position, is applied to the display platforms 102 and 104 in a first direction, such as in a direction to cause surfaces of the display platforms opposite of the flexible display screen 106 move toward each other. The force applied to the display platforms 102 and 104 can be transferred to the bi-stable hinges 110, which in turn will bend or flex at bend zones 114 to enable the display platforms to move from the open position. When the strength of the curvature 204, shown in FIG. 2, and thickness of the bend zone 114 are overcome by the force applied in the first direction, the bi-stable hinges 110 can automatically cause the display platforms 102 and 104 to snap close from the open position of FIG. 1 to the closed position shown in FIG. 3.

Figure 3:
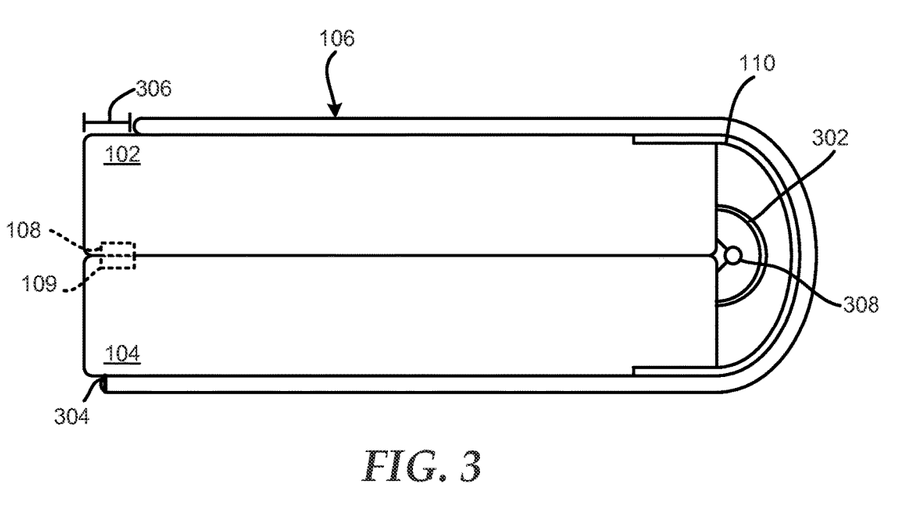
FIG. 3 is a diagram of the information handling system in a closed position according to an embodiment of the present disclosure.

FIG. 3 illustrates the information handling system 100 in a closed position according to an embodiment of the present disclosure. As shown in FIG. 3, when the display platforms 102 and 104 are in the closed position, the closing magnets 108 in the display platform 102 are placed in close proximity with the closing magnets 109 in the display platform 104. As the display platforms 102 and 104 approach the closed position the closing magnets 108 can attract the closing magnets 109 to cause the display platforms to properly align. In this embodiment, the closing magnets 108 and 109 can have enough attractive force between the pairs of magnets to hold the display platforms 102 and 104 together in the closed position. In another embodiment, the closing magnets 108 or the closing magnets 109 can be replaced with a metal plate, such the closing magnets 108 or 109 attract the metal plate in the other display platform. For example, the display platform 104 can include metal plates instead of the closing magnets 109, and as the display platforms 102 and 104 approach the closed position the closing magnets 108 can attract the metal plate within the display platform 104 to cause the display platforms to properly align.

The information handling system 100 further includes cable reinforcement 302 having a first end connected to the display platform 102 and a second end connected to the display platform 104. In an embodiment, the cable reinforcement 302 can limit the distance that the display platforms 102 and 104 can separate from each other, and therefore the length of the cable reinforcement can prevent the over-extension of the bi-stable hinges 110 and the flexible display screen 106.

In different embodiments, the flexible display screen 106 can be stabilized or mounted to either the display platform 102 or to the display platform 104. For example, in the embodiment illustrated in FIG. 3, the flexible display screen 106 is mounted to the display platform 104 at a mounting point 304. In this embodiment, as the display platforms 102 and 104 transition from the open position (shown in FIG. 1) to the closed position (depicted in FIG. 3), the flexible display screen 106 slides along the display platform 102 in response to a increase in the size of the gap 112 between the edges of the display platforms nearest to the flexible display screen. For example, as the information handling system 100 is closed, an edge of the flexible display screen 106 slides away from an edge of the display platform 102 opposite that of the display platform 104 and toward the center of the display platform 102, such that a distance 306 between the edge of display screen and the edge of the display platform increases. The slide material 210, of FIG. 2, can aid in the in the sliding of the flexible display screen 106 across display platform 102 until the information handling system is in the closed position.

In another embodiment, the flexible display screen 106 is mounted to the display platform 102, and can slide along the display platform 104. In this embodiment, as the display platforms 102 and 104 transition from the open position to the closed position, the flexible display screen 106 slides along the display platform 104 in response to a increase in the size of the gap 112 between the edges of the display platforms nearest to the flexible display screen. For example, as the information handling system 100 is closed, an edge of the flexible display screen 106 slides away from an edge of the display platform 104 opposite that of the display platform 102 and toward the center of the display platform 104.

In another embodiment, the flexible display screen 106 can slide along both of the display platforms 102 and 104. In this embodiment, as the display platforms 102 and 104 transition from the open position to the closed position, the flexible display screen 106 slides along both of the display platforms 102 and 104 in response to a increase in the size of the gap 112 between the edges of the display platforms nearest to the flexible display screen. For example, as the information handling system 100 is closed, an edge of the flexible display screen 106 slides away from an edge of the display platform 104 opposite that of the display platform 102 and toward the center of the display platform 104, and an edge of the flexible display screen slides away from an edge of the display platform 102 opposite that of the display platform 104 and toward the center of the display platform 102. The distance that the edges of the display platforms 106 slides away from the associated edges of the display platforms 102 and 104 in this embodiment is less than the distance a single edge of the display screen slides away from the associated edge of the display platform 102 or 104.

The information handling system 100 also includes a locking mechanism 308 connected to the display platforms 102 and 104. In an embodiment, the locking mechanism 308 can be a ratchet device that can have multiple locking positions to hold display platforms at different angles in between the opening position and a reader position described below with respect to FIG. 4, and can have a push/pull to release locking component as described below. A first locking position of the locking mechanism 308 can be in the open position of the display platforms 102 and 104. In this embodiment, the locking mechanism 308 can be unlocked by an individual pushing/pulling the display platforms 102 and 104 slightly in a first direction that is opposite of the direction of the closed position, and then the locking mechanism can be released to freely rotate in the direction of the closed position. When the locking mechanism is unlocked, the display platforms 102 and 104 can automatically transition from the open position to the closed position after the strength of the curvature 204 of the bi-stable hinges 110 is overcome by a force in the direction of the closed position.

In an embodiment, while the information handling system 100 is in the closed position, a force strong enough to overcome the attractive force between the closing magnets 108 and 109, or between closing magnets 108 or 109 and the metal plates, can be applied to the display platforms 102 and 104. The application of this force can cause the bi-stable hinges 110 to flex back to a straight line, such that the display platforms 102 and 104 return to the open position shown in FIG. 1.

Referring back to FIG. 1, the information handling system 100 can be in the open position and a force is applied to the display platforms 102 and 104 in a second direction, such as in a direction to cause surfaces of the display platforms near the flexible display screen 106 move toward each other. The force being applied in the second direction can be transferred to the bi-stable hinges 110, which in turn will bend or flex at bend zones 114. When the strength of the curvature 204 of the bend zone 114 is overcome by the force applied in the second direction, the bi-stable hinges 110 can bend at the bend zone and allow the display platforms 102 and 104 to transition from the open position to the reader position as shown in FIG. 4.

Figure 4:
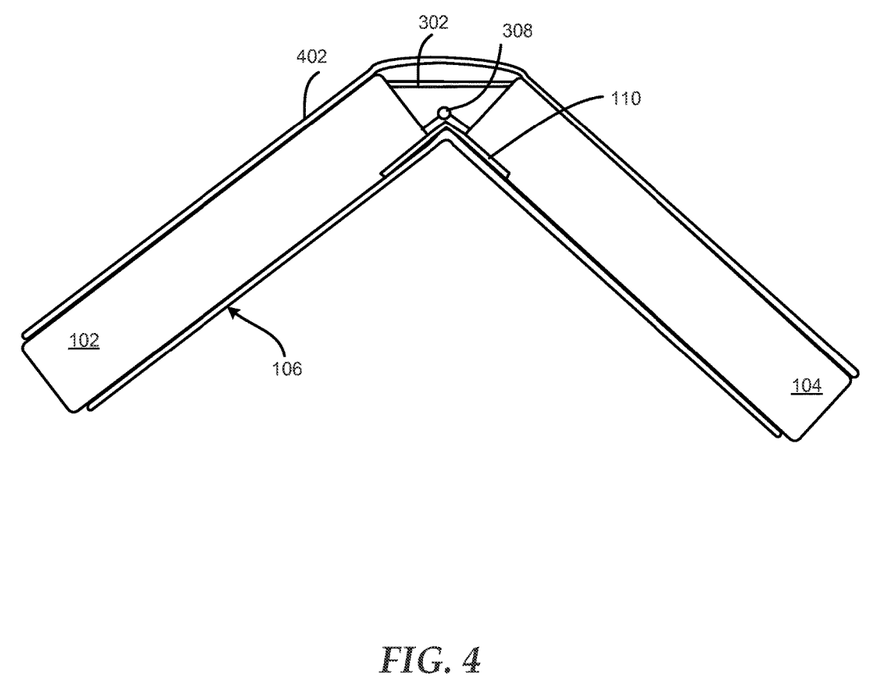
FIG. 4 is a diagram of the information handling system in a reader position according to an embodiment of the present disclosure.

FIG. 4 shows the information handling system 100 in the reader position in accordance with an embodiment of the present invention. As the display platforms 102 and 104 transition from the open position to the reader position, the bi-stable hinges 110 can bend or flex, and the flexible display screen 106 can slide along the display platform 102 in response to the decrease in the size of the gap 112 between the edges of the display platforms nearest to the flexible display screen 106. For example, as the information handling system 100 moves to the reader position, an edge of the flexible display screen 106 slides toward the edge of the display platform 102 opposite of the display platform 104. The slide material 210, of FIG. 2, can aid in the sliding of the flexible display screen 106 across display platform 102 until the information handling system 100 is in the reader position. As shown in FIG. 4, the cable reinforcement 302 can limit the amount that the display platforms 102 and 104 rotate in the reader position, and therefore the length of the cable reinforcement can limit the over-extension of the bi-stable hinges 110.

The locking mechanism 308 can have a locking position in a laptop position, which can hold the display platforms 102 and 104 at a predetermined angle in between the open position (shown in FIG. 1) and the reader position (depicted in FIG. 4). In another embodiment, the display platforms 102 and 104 can be at the same angle in both the laptop position and the reader position, but the orientation of the information handling system can be different. In an embodiment, the information handling system 100 can be in the laptop position in response to one of the display platforms 102 or 104 being placed on a surface, such as a lap, desk, table, or the like, and the locking mechanism 308 holding the display platforms at a predetermined angle. In this position, a portion of the flexible display screen 106 can be utilized as a virtual keyboard, and another portion of the display screen can be utilized to display an application being executed in the information handling system 100. The display platforms 102 and 104 can be held in the laptop position by the locking mechanism 308 without an individual having to continually apply a force to one or both of display platforms.

The locking mechanism 308 can be unlocked from the laptop position by an individual pushing/pulling the display platforms 102 and 104 slightly in a direction opposite of the direction of the reader position, and then the locking mechanism can be released to freely rotate in the direction of the reader position. The display platforms 102 and 104 can then transition from the laptop position to the reader position. Upon the display platforms 102 and 104 being placed in the reader position the locking mechanism 308 can lock to hold the display platforms in the reader position, such that the information handling system can be utilized in the reader position with an individual having to continue to apply the necessary force to the display platforms. The information handling system 100 also includes a cover 402 that surrounds the display platforms 102 and 104. In the embodiment illustrated in FIG. 4, the cover 402 is connected to the edge of the display platforms 102 and 104 opposite that of the display screen. In this embodiment, the cover 402 encloses the display platforms 102 and 104 and the gap 112 so that the cable 302, the locking mechanism 308, and bi-stable hinges 110 cannot be seen.

The locking mechanism 308 can be unlocked from the reader position by an individual pushing/pulling the display platforms 102 and 104 slightly past the reader position, and then the locking mechanism can be released to freely rotate in the direction of the open position the bi-stable hinges 110 can cause the display platforms 102 and 104 to automatically transition from the reader position to the open position in response to the display platforms no longer being locked in the reader position. Thus, when the force applied by a locking mechanism to hold the display platforms 102 and 104 in the reader position is removed, the rigidity of the bi-stable hinges 110 can force the information handling system 100 back to the open position.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a flexible display screen;
   first and second display platforms, the flexible display screen movably mounted to the first and second display platforms; and
   a bi-stable hinge having a bi-stable strip hinge element with a cross-section curvature at a bend zone, the bi-stable hinge having a first extension from the bend zone mount to the first display platform and a second extension from the bend zone on an opposite side from the first extension mounted to the second display platforms, wherein to the bistable hinge couples the first display platform to the second display platform and the bi-stable hinge to lock the first and second display platforms in an open position and to snap close the first and second display platforms from the open position to a closed position in response to the bi-stable hinge being stressed in a first direction to overcome the rigidity of the cross-section curvature.

2. The information handling system of claim 1, further comprising:
   a closing magnet located within either the first display platform or the second display platform, the closing magnet to hold the first and second display platforms in the closed position.

3. The information handling system of claim 1, the bi-stable hinge to bend and place the first and second display platforms in a reader position in response to the bi-stable hinge being stressed in a second direction.

4. The information handling system of claim 3, further comprising:
   a locking mechanism connected to the first and second display platforms, the locking mechanism to hold the first and second display platforms in the reader position.

5. The information handling system of claim 1, wherein a cross section of the bi-stable hinge element has a curved cross section that is concave to the flexible display screen.

6. The information handling system of claim 4, further comprising:
   a cover in physical communication with an edge of the first display platform opposite of the flexible display screen and an edge second display platform opposite of the flexible display screen, the cover to extend across a gap between the first and second display platforms.

7. The information handling system of claim 3, the flexible display screen to slide along the first display platform in response to first and second display platforms moving from the open position to the closed position.

8. An information handling system comprising:
   a flexible display screen;
   first and second display platforms, the flexible display screen to be movably mounted to the first and second display platforms;
   slip material in physical communication in between the flexible display screen and the first display platform and in between the flexible display screen and the second display platform, the slip material to enable the flexible display screen to slide along the first display platform; and
   a bi-stable hinge having a bi-stable strip hinge element with a cross-section curvature at a bend zone, the bi-stable hinge having a first extension from the bend zone to mount to the first display platform and a second extension from the bend zone on an opposite side from the first extension mounted to the second display platform, wherein the bi-stable hinge couples the first display platform to the second display platform, the bi-stable hinge to lock the first and second display platforms in an open position and to snap close the first and second display platforms from the open position to a closed position in response to the bi-stable hinge being stressed in a first direction to overcome the rigidity of the cross-section curvature.

9. The information handling system of claim 8, further comprising:

a closing magnet located within either the first display platform or the second display platform, the closing magnet to hold the first and second display platforms in the closed position.

10. The information handling system of claim 8, the bi-stable hinge to bend and place the first and second display platforms in a reader position in response to the bi-stable hinge being stressed in a second direction.

11. The information handling system of claim 10, further comprising:
a locking mechanism connected to the first and second display platforms, the locking mechanism to hold the first and second display platforms in the reader position.

12. The information handling system of claim 8, wherein a cross section of the bi-stable hinge element has a curved cross section that is concave to the flexible display screen.

13. The information handling system of claim 11, further comprising:
a cover in physical communication with an edge of the first display platform opposite of the flexible display screen and an edge second display platform opposite of the flexible display screen, the cover to extend across a gap between the first and second display platforms.

14. The information handling system of claim 13, the flexible display screen to slide along the first display platform in response to first and second display platforms moving from the open position to the closed position.

15. A bi-stable hinge for an information handling system, the bi-stable hinge comprising:
a curved cross section at a bend zone of a bi-stable strip hinge element having a curvature defined by:
a bottom portion having a first extension from the bend zone to be placed in physical communication with a bottom surface of a first cavity of a first display platform of the information handling system and portion having a second extension from the bend zone opposite of the first extension and placed in physical communication with a bottom surface of a second cavity of a second display platform of the information handling system; and
the curvature of the curved cross section to lock the bi-stable hinge and the first and second display platforms in an open position, and in response to the bi-stable hinge being stressed in a first direction to overcome the rigidity of the cross-section curvature, to cause the bit-stable hinge snap close the first and second display platforms from the open position to a closed position,
wherein the bi-stable hinge element couples the first display platform to the second display platform across the curved cross section bend zone between the first and second extensions.

16. The bi-stable hinge of claim 15, further including:
a first thickness to cause a rigidity the bi-stable hinge element to stabilize the bi-stable hinge in the open position.

17. The bi-stable hinge of claim 16, further including:
the bend zone defined by a portion of a length of the bi-stable hinge element having a second thickness, wherein the second thickness isolates a location for bending, in response to an applied force, of the bi-stable hinge to be within the bend zone, wherein the second thickness is less than the first thickness.

18. The bi-stable hinge of claim 15, wherein the curvature holds the bi-stable hinge in the closed position after the bi-stable hinge is snap closed.

19. The bi-stable hinge of claim 15, wherein in response to the bi-stable hinge being stressed in a second direction while the bit-stable hinge is in the closed position, the curvature to bend and force the first and second display platforms to transition from the closed position to the open position.

20. The bi-stable hinge of claim 15, wherein in response to the bi-stable hinge being stressed in a second direction, the curvature to bend and place the first and second display platforms in a reader position.

* * * * *